US011663116B2

(12) United States Patent
Poirier

(10) Patent No.: US 11,663,116 B2
(45) Date of Patent: *May 30, 2023

(54) SYSTEMS AND METHODS FOR AUTOMATED TEST DATA MICROSERVICES

(71) Applicant: The Travelers Indemnity Company, Hartford, CT (US)

(72) Inventor: Michael J. Poirier, Simsbury, CT (US)

(73) Assignee: The Travelers Indemnity Company, Hartford, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/972,205

(22) Filed: Oct. 24, 2022

(65) Prior Publication Data
US 2023/0041477 A1 Feb. 9, 2023

Related U.S. Application Data

(63) Continuation of application No. 17/032,186, filed on Sep. 25, 2020, now Pat. No. 11,520,688.

(51) Int. Cl.
G06F 11/36 (2006.01)
(52) U.S. Cl.
CPC ........ G06F 11/3688 (2013.01); G06F 11/368 (2013.01); G06F 11/3684 (2013.01); G06F 11/3692 (2013.01); G06F 11/3696 (2013.01)
(58) Field of Classification Search
CPC ............. G06F 11/3696; G06F 11/3692; G06F 11/3684; G06F 11/368; G06F 11/3688
See application file for complete search history.

(56) References Cited

U.S. PATENT DOCUMENTS

| | | | | | |
|---|---|---|---|---|---|
| 5,701,408 | A | * | 12/1997 | Cornell ............... | G06F 11/3692 714/E11.208 |
| 7,149,698 | B2 | * | 12/2006 | Guheen ................. | G06Q 99/00 705/319 |
| 7,328,134 | B1 | * | 2/2008 | Burbidge, III ...... | G06F 11/3688 702/186 |
| 11,544,177 | B2 | * | 1/2023 | Periyathambi ...... | G06F 11/3688 |
| 2006/0070034 | A1 | * | 3/2006 | Balfe ................. | G06F 11/3672 717/124 |
| 2010/0251032 | A1 | * | 9/2010 | Macary ............... | G06F 11/3476 714/38.14 |
| 2017/0060713 | A1 | * | 3/2017 | Wang .................. | G06F 11/3692 |

(Continued)

OTHER PUBLICATIONS

Office Action for U.S. Appl. No. 17/032,186 dated Jan. 6, 2022; 23 pps.

(Continued)

*Primary Examiner* — Wei Y Zhen
*Assistant Examiner* — Brahim Bourzik
(74) *Attorney, Agent, or Firm* — RowanTree Law Group, PLLC; Carson C.K. Fincham

(57) ABSTRACT

Systems and methods for automated test data microservices are provided. Test versions of software (such as an Application Programming Interface (API)) may be configured to automatically generate test data and to call a microservice to manage the test data. The microservice may automatically add and remove the test data from an operational data store to facilitate the testing process and to automatically perform setup and teardown stages of the testing process.

16 Claims, 9 Drawing Sheets

(56) References Cited

U.S. PATENT DOCUMENTS

| | | | | |
|---|---|---|---|---|
| 2017/0220458 A1* | 8/2017 | Finger | ............... | G06F 11/3688 |
| 2017/0242784 A1* | 8/2017 | Heorhiadi | ........... | G06F 11/3684 |
| 2018/0039565 A1* | 2/2018 | Rajagopalan | ....... | G06F 11/3476 |
| 2020/0351569 A1* | 11/2020 | Shamarao | ........... | G06F 11/3688 |
| 2022/0174588 A1* | 6/2022 | Fieau | ............... | H04L 43/0817 |

OTHER PUBLICATIONS

Notice of Allowance for U.S. Appl. No. 17/032,186 dated Jul. 27, 2022; 8 pps.

* cited by examiner

SYSTEMS AND METHODS FOR AUTOMATED TEST DATA MICROSERVICES

CROSS-REFERENCE TO RELATED APPLICATIONS

This disclosure claims benefit and priority under 35 U.S.C. § 120 to, and is a Continuation of, U.S. patent application Ser. No. 17/032,186 filed on Sep. 25, 2020 and titled "SYSTEMS AND METHODS FOR AUTOMATED TEST DATA MICROSERVICES", which issued as U.S. Pat. No. 11,520,688 on Dec. 6, 2022, which is hereby incorporated by reference herein in its entirety.

BACKGROUND

Many modern programming efforts are implemented utilizing microservice architecture, which has become a common software engineering approach that results in software applications that are executable through a collection of loosely coupled, independently deployable, often single-function modules or services. In many cases, these "microservices" may be developed as an Application Programming Interface (API). One of the advantages of utilizing microservices is that the resulting application/system is highly testable. Indeed, testing of microservices (such as an API) is a frequent occurrence in many Continuous Integration/Continuous Deployment (CI/CD) processes in organizations that leverage microservice software development architecture. Such testing activities are labor intensive (e.g., complicated and tedious), however, and can accordingly lead to production and/or quality assurance delays.

BRIEF DESCRIPTION OF THE DRAWINGS

The figures depict embodiments for purposes of illustration only. One skilled in the art will readily recognize from the following description that alternative embodiments of the systems and methods illustrated herein may be employed without departing from the principles described herein, wherein.

DETAILED DESCRIPTION

I. Introduction

Microservice and/or Application Programming Interface (API) testing can be a complex and time-intensive process. A single API test suite may, for example, require thousands of (e.g., upwards of three thousand (3,000)) individual tests. Accordingly, any improvement in how a system conducts such tests may be capable of drastically increasing the efficiency of testing for any particular development project. Previous systems, however, have failed to address various aspects of microservice and/or API testing and have accordingly failed to provide such increased efficiencies. In such systems, the amount of time spent testing microservice and/or API components may significantly detract from the advantages of implementing a microservice architecture processing system.

In accordance with embodiments herein, these and other deficiencies of previous solutions are remedied by providing systems, apparatus, methods, and articles of manufacture for automated test data microservices. The inventor has realized, for example, that one significant bottleneck in microservice/API testing, such as in furtherance of a Continuous Integration/Continuous Deployment (CI/CD) process, centers on the creation and implementation of test data. As is described in more detail hereinafter, for example, management of test data by a developer may consume much of the developer's time, may create conflicts with other developers' testing processes, and/or may delay microservice and/or API testing results. Embodiments described herein provide increased efficiencies in the test data implementation process, thereby reducing the time, expense, and delay involved in microservice and/or API testing.

II. Microservice/API Test Systems

Figure 1:
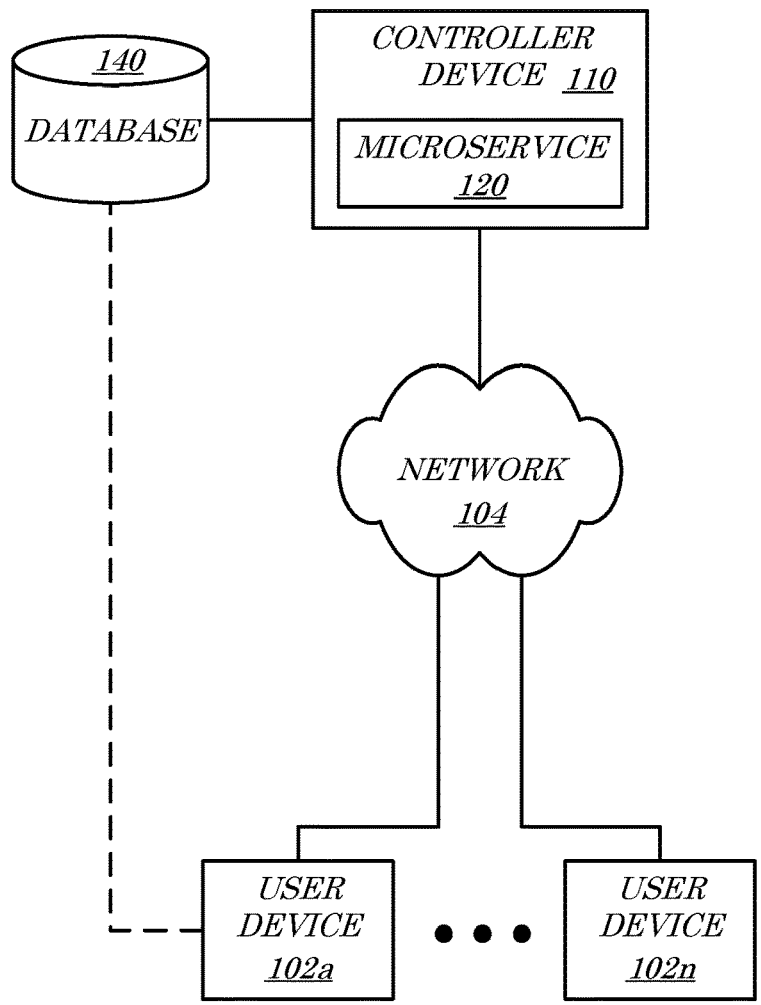
FIG. 1 is a block diagram of a system according to some embodiments.

Referring first to FIG. 1, a block diagram of a system 100 according to some embodiments is shown. In some embodiments, the system 100 may comprise a plurality of user devices 102a-n, a network 104, a controller device 110, a microservice 120, and/or a database 140. As depicted in FIG. 1, any or all of the devices 102a-n, 110, 120, 140 (or any combinations thereof) may be in communication via the network 104. In some embodiments, the system 100 may be utilized to increase the efficiency of microservice and/or API testing processes by automating test data management. The controller device 110 may, for example, interface with one or more of the user devices 102a-n that initiate a call to the microservice 120 to effectuate automatic test data creation (e.g., in the database 140) and/or deletion (e.g., removal from the database 140).

Fewer or more components 102a-n, 110, 120, 140 and/or various configurations of the depicted components 102a-n, 110, 120, 140 may be included in the system 100 without deviating from the scope of embodiments described herein. In some embodiments, the components 102a-n, 110, 120, 140 may be similar in configuration and/or functionality to similarly named and/or numbered components as described herein. In some embodiments, the system 100 (and/or portion thereof) may comprise an automated test data microservice program, system, and/or platform programmed and/or otherwise configured to execute, conduct, and/or facilitate the method 500 of FIG. 5 herein, and/or portions thereof.

The user devices 102a-n, in some embodiments, may comprise any types or configurations of computing, mobile electronic, network, user, and/or communication devices that are or become known or practicable. The user devices 102a-n may, for example, comprise one or more tablet computers, such as an iPad® manufactured by Apple®, Inc. of Cupertino, Calif., programming workstations, such as the Titan® C200™ compact AMD® RYZEN® 9 Workstation PC (manufactured by Titan® Computers of Hallandale Beach, Fla.), and/or cellular and/or wireless telephones or "smart" phones, such as an iPhone® 11 (also manufactured by Apple®, Inc.) or an Optimus™ L90™ smart phone manufactured by LG® Electronics, Inc. of San Diego, Calif., and running the Android® operating system from Google®, Inc. of Mountain View, Calif., or a Galaxy® Note20™ 5G (manufactured by Samsung® Electronics Co., Ltd. of Suwon, South Korea). In some embodiments, the user devices 102a-n may comprise devices owned and/or operated by one or more users, such as microservice and/or API software engineers, programmers, developers, and/or testers. According to some embodiments, the user devices 102a-n may communicate with the controller device 110 via the network 104 to invoke and/or utilize automated test data services provided by the microservice 120, as described herein. In some embodiments, the user devices 102a-n may interface with the controller device 110 to effectuate communications (direct or indirect) with one or more other user devices 102a-n (such communication not explicitly shown in FIG. 1) operated by other users, for example. In some embodiments, the user devices 102a-n may directly interface with the database 140.

The network 104 may, according to some embodiments, comprise a Local Area Network (LAN; wireless and/or wired), cellular telephone, Bluetooth® and/or Bluetooth® Low Energy (BLE), Near Field Communication (NFC), and/or Radio Frequency (RF) network with communication links between the controller device 110, the user devices 102a-n, the microservice 120, and/or the database 140. In some embodiments, the network 104 may comprise direct communications links between any or all of the components 102a-n, 110, 120, 140 of the system 100. The user devices 102a-n may, for example, be directly interfaced or connected to one or more of the controller device 110 and/or the microservice 120 via one or more wires, cables, wireless links, and/or other network components, such network components (e.g., communication links) comprising portions of the network 104. In some embodiments, the network 104 may comprise one or many other links or network components other than those depicted in FIG. 1. The user devices 102a-n may, for example, be connected to the controller device 110 via various cell towers, routers, repeaters, ports, switches, and/or other network components that comprise the Internet and/or a cellular telephone (and/or Public Switched Telephone Network (PSTN)) network, and which comprise portions of the network 104.

While the network 104 is depicted in FIG. 1 as a single object, the network 104 may comprise any number, type, and/or configuration of networks that is or becomes known or practicable. According to some embodiments, the network 104 may comprise a conglomeration of different sub-networks and/or network components interconnected, directly or indirectly, by the components 102a-n, 110, 120, 140 of the system 100. The network 104 may comprise one or more cellular telephone networks with communication links between the user devices 102a-n and the controller device 110, for example.

In some embodiments, the controller device 110 may comprise an electronic and/or computerized controller device, such as a computer server communicatively coupled to interface with the user devices 102a-n (directly and/or indirectly). The controller device 110 may, for example, comprise one or more PowerEdge™ R840 rack servers manufactured by Dell®, Inc. of Round Rock, Tex., which may include one or more Twelve-Core Intel® Xeon® E5-4640 v4 electronic processing devices. In some embodiments, the controller device 110 may comprise a plurality of processing devices specially programmed to execute and/or conduct processes that are not practicable without the aid of the controller device 110. The controller device 110 may, for example, execute the microservice 120 that is operable to process hundreds or thousands of test data management requests (e.g., from the user device 102a-n) simultaneously, as described herein, such automatic multi-client test data management services not being capable of being conducted without the benefit of the specially-programmed controller 110 (and/or the specially programmed microservice 120), particularly not within timeframes that prevent excessive queuing and/or delays (e.g., within a matter of minutes). According to some embodiments, the controller device 110 may be located remotely from one or more of the user devices 102a-n and/or the database 140. The controller device 110 may also or alternatively comprise a plurality of electronic processing devices located at one or more various sites and/or locations.

According to some embodiments, the controller device 110 may store and/or execute specially programmed instructions to operate in accordance with embodiments described herein. The controller device 110 may, for example, execute the microservice 120, e.g., in an online or enterprise environment, as utilized in various applications, such as, but not limited to, CI/CD processes, as described herein. According to some embodiments, the controller device 110 may comprise a computerized processing device, such as a computer server and/or other electronic device to manage and/or facilitate queries and/or communications to and/or from the user devices 102a-n. A software developer and/or tester utilizing one or more of the user devices 102a-n may, for example, effectuate communications with the controller device 110 by initiating a call to the microservice 120 to, e.g., (i) pass test data to the microservice 120, (ii) request that the microservice 120 add test data to the database 140, (iii) receive test data identifiers from the microservice 120, and/or (iv) request that the microservice 120 remove/delete test data from the database 140, as described herein.

In some embodiments, the controller device 110 and/or the microservice 120 (and/or the user devices 102a-n) may be in communication with the database 140. The database 140 may store, for example, a copy of production data and/or testing data (e.g., simulated credit card numbers, messages in a message queue, names and addresses, transaction details, etc.), and/or instructions that cause various devices and/or components (e.g., the controller device 110, the microservice 120, and/or the user devices 102a-n) to operate in accordance with embodiments described herein. The database 140 may store, for example, one or more batch job files, data transformation scripts, insured object data (e.g., type, capability, and/or location), decision-making data (e.g., thresholds and/or logic), and/or coded instructions (e.g., defining the microservice 120 and/or one or more components thereof). In some embodiments, the database 140 may comprise any type, configuration, and/or quantity of data storage devices that are or become known or practicable. The database 140 may, for example, comprise an array of optical and/or solid-state hard drives configured to store copies of various production and/or operational data, test data, and/or various operating instructions, drivers, etc. While the database 140 is depicted as a stand-alone component of the system 100 in FIG. 1, the database 140 may comprise multiple components. In some embodiments, a multi-component database 140 may be distributed across various devices and/or may comprise remotely dispersed components. Any or all of the user devices 102a-n may comprise the database 140 or a portion thereof, for example, and/or the controller device 110 may comprise the database 140 or a portion thereof.

In some embodiments, the system 100 may be utilized to increase the efficiency of microservice, API, and/or other software development testing procedures by automatically managing test data for the testing process. To better illustrate how the embodiments described herein provide novel solutions to testing bottleneck issues, a description of typical testing procedures is illustrated in FIG. 2.

Figure 2:
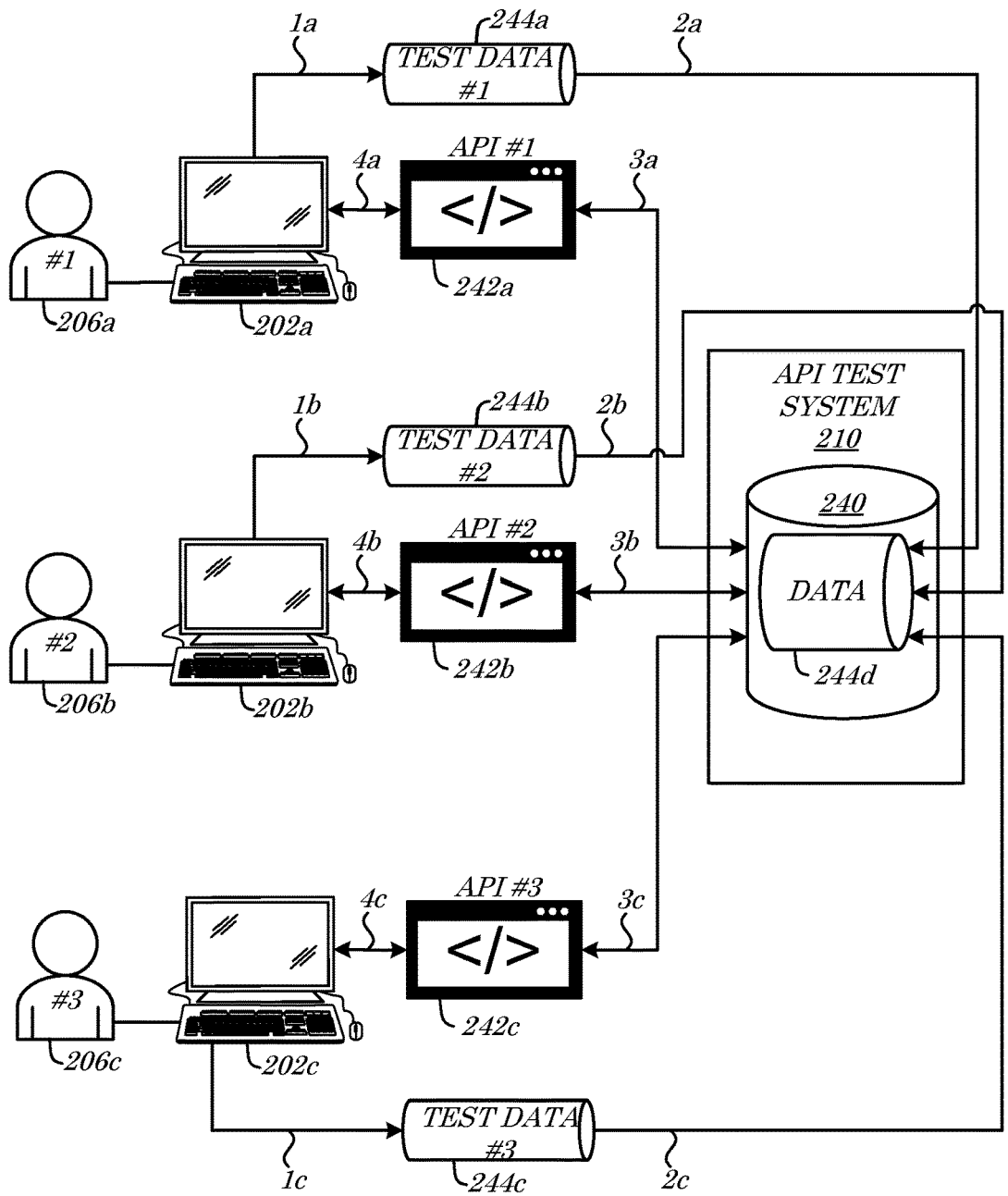
FIG. 2 is a functional block diagram of a prior art system according to some embodiments.

Turning to FIG. 2, for example, a functional block diagram of a prior art system 200 is shown. In typical enterprises the system 200 may comprise a plurality of software developer devices 202a-c, each software developer device 202a-c operated by a respective software developer 206a-c (or other programmer, tester, etc.). The software developers 206a-c may generally utilize the software developer devices 202a-c (either stand-alone or in coordination with an API test system 210 comprising a database 240) to create, develop, generate, and/or define a test version of an API 242a-c (or other software program, module, etc.). As depicted in FIG. 2, the APIs 242a-c may be tested utilizing respective test data 244a-c. Typically, the test data 244a-c is created by each software developer 206a-c, as depicted by steps 1a-c. The test data 244a-c is then deposited, by the software developers 206a-c, in data 244d stored by the database 240, at steps 2a-c. The creation and disposition of the test data may be referred to as a "setup" process. Once the test data 244a-c is stored, inserted into, or added to the data 244d, the software developers 206a-c run a "test" of the test version of their respective APIs 242a-c against the data 244d, at steps 3a-c. Test results are then provided back to the software developers 206a-c (to the software developer devices 202a-c) at steps 4a-c.

Ideally, the software developers 206a-c would, after completing the test, go back into the data 244d and remove, replace, and/or edit data elements as needed to place the data 244d back into the original configuration as it existed prior to the test (e.g., "teardown"). This step is not depicted in FIG. 2 for it often does not occur. Similarly, while the steps 2a-c of depositing the test data into the database 240 are depicted, in many cases they are not conducted either. In both cases, subsequent testing attempts may produce errors or may not be capable of being conducted at all. In the case that a test version of a first API 242a comprises an application for deleting a user record in the data 244d, for example, it must be ensured that a valid user record exists in the data 244d, e.g., by depositing first test data 244a before each test of the test version of the first API 242a (otherwise the test will fail because there is no valid record to delete). Further, in the case that the plurality of software developers 206a-c access and utilize the API test system 210 simultaneously or contemporaneously, there is the possibility that the different test data 244a-c may overlap or conflict, causing testing errors for multiple software developers 206a-c at the same time.

Figure 3:
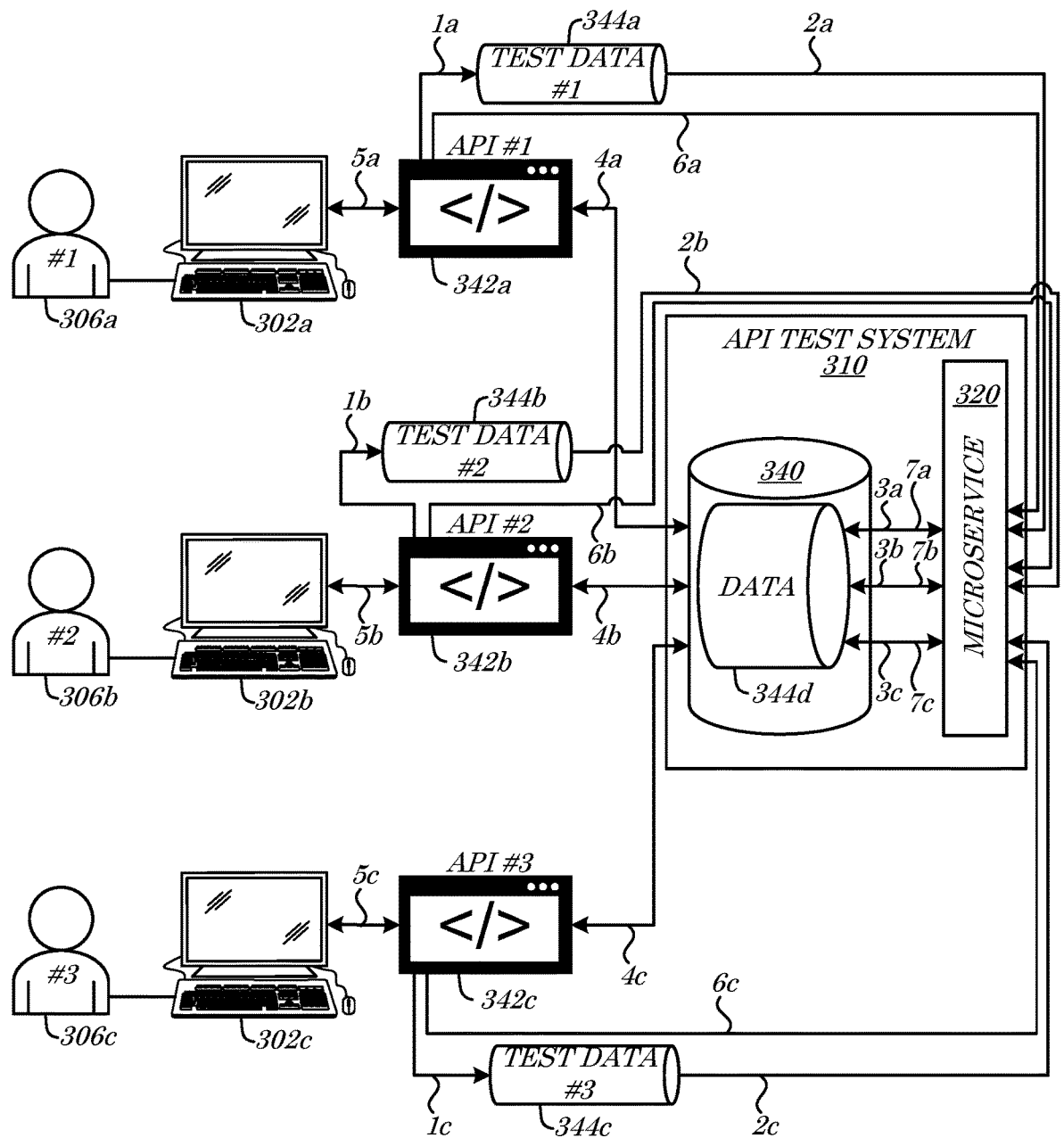
FIG. 3 is a functional block diagram of a system according to some embodiments.

Turning now to FIG. 3, a functional block diagram of system 300 according to some embodiments is shown. In some embodiments, the system 300 may comprise a system that provides for automatic test data management. The system 300 may comprise, for example, a plurality of user devices 302a-c operated by (e.g., receiving input from) a plurality of respective users 306a-c. According to some embodiments, the users 306a-c may comprise programmers, developers, and/or testers/integrators that utilize the user devices 302a-c to develop and/or test software code, modules, procedures, libraries, and/or services utilizing, e.g., an API test system 310. In some embodiments, the API test system 310 (or the system 300) may comprise a software development platform or system that comprises a microservice 320 that is programmed and coupled to facilitate testing by the users 306a-c. According to some embodiments, the microservice 320 may interface with and/or manage data transactions between, for example, the user devices 302a-c and a database 340 of the API test system 310.

In some embodiments, the users 306a-c may utilize the user devices 302a-c to develop respective test versions of APIs 342a-c (or other software, such as microservices, modules, etc.; with the term "API" being employed for convenience of reference). According to some embodiments, the test versions of the APIs 342a-c developed, created, coded, defined, and/or selected by the users 306a-c may be configured to automatically generate their own respective test data 344a-c. The users 306a-c may structure the test versions of the APIs 342a-c, for example, to generate the respective test data 344a-c, at 1a-c. In some embodiments, the test data 344a-c and/or the test version of the API 342a-c may initiate a first call to the microservice 320, at 2a-c. The call may, for example, comprise a request that the microservice 320 add the test data 344a-c and/or individual data elements thereof to the database 340 and/or to one or more stores of data 344d thereof. According to some embodiments, the microservice 320 may be responsive to the first call to add, insert, append, and/or otherwise transmit the test data 344a-c (and/or designated elements thereof) to the data 344d (e.g., in the database 340), at 3a-c. In some embodiments, the test versions of the APIs 342a-c may be executed and/or tested by communicating with the database 340 and/or operating upon the data 344d, at 4a-c.

According to some embodiments, test results may be provided to (and/or determined by) the respective user devices 302a-c, at 5a-c. In some embodiments, the test versions of the APIs 342a-c may initiate a second call to the microservice 320, at 6a-c. The second call may, for example, comprise a request for the microservice 320 to remove, delete, and/or disable the test data 344a-c in the data 344d. According to some embodiments, the microservice 320 may be responsive to the second call to effectuate a removal or deletion of the test data 344a-c (and/or specific data elements thereof) from the database 340 and/or data 344d, at 7a-c. In such a manner, for example, the microservice 320 may provide a service to the test versions of the APIs 342a-c that allows for automatic management of the test data 344a-c with respect to the database 340 in the API test system 310. Such automatic management ensures that the data 344d remains clean and usable for each of the users 306a-c, while also reducing the overhead of the testing process. In some embodiments, the microservice 320 (and calls thereto) may effectively replace the need for the users 306a-c to be involved in the "setup" and "teardown" phases of the testing process, allowing the users 306a-c to focus their time and energy on the actual "testing" of the test versions of the APIs 342a-c.

Fewer or more components 302a-c, 306a-c, 310, 320, 340, 342a-c, 344a-d and/or various configurations of the depicted components 302a-c, 306a-c, 310, 320, 340, 342a-c, 344a-d may be included in the system 300 without deviating from the scope of embodiments described herein. In some embodiments, the components 302a-c, 306a-c, 310, 320, 340, 342a-c, 344a-d may be similar in configuration and/or functionality to similarly named and/or numbered components as described herein. In some embodiments, the system 300 (and/or portions thereof) may comprise an automated test data microservice program, system, and/or platform programmed and/or otherwise configured to execute, conduct, and/or facilitate the method 500 of FIG. 5 herein, and/or portions thereof.

Figure 4:
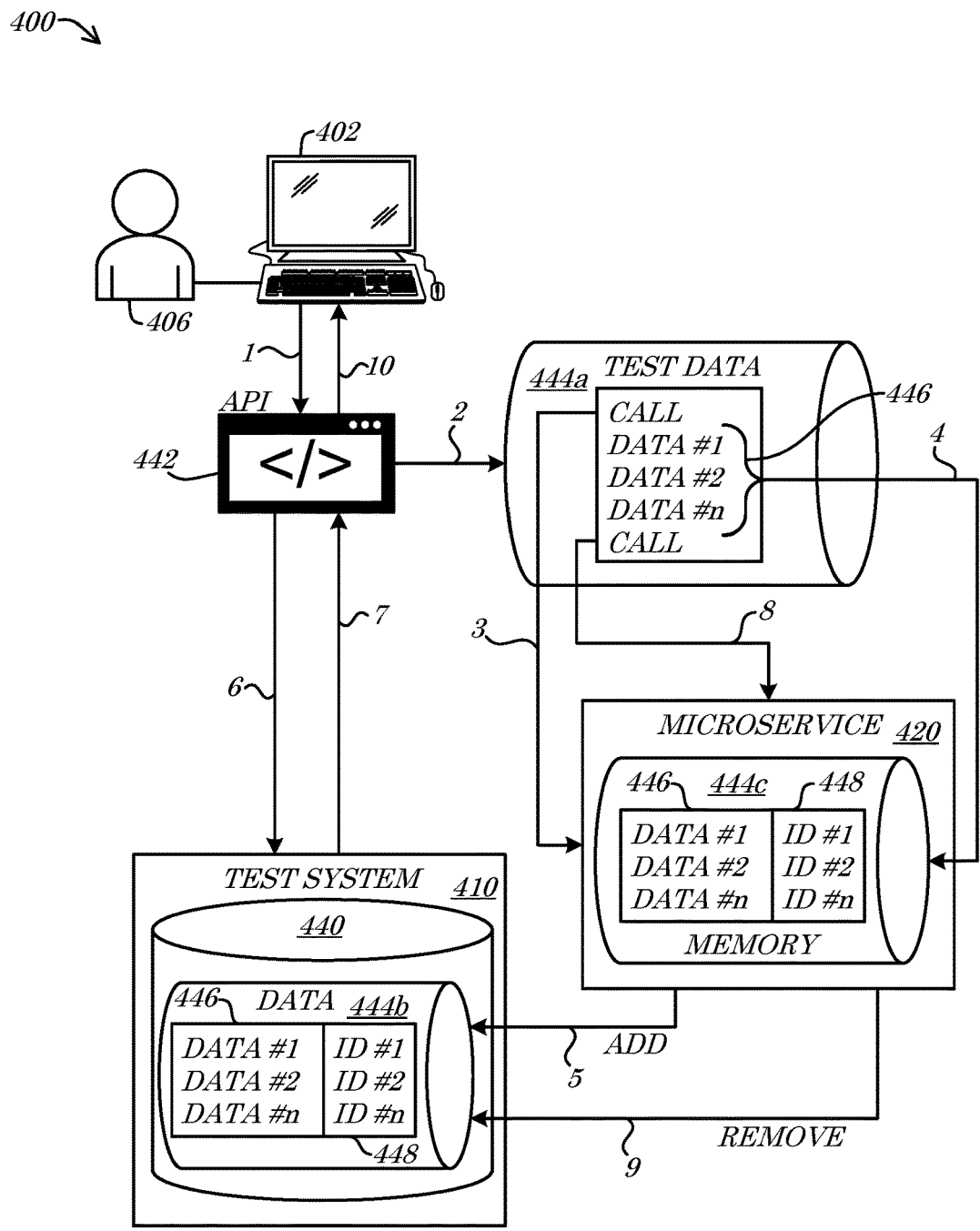
FIG. 4 is a functional block diagram of a system according to some embodiments.

Referring now to FIG. 4, a functional block diagram of a system 400 according to some embodiments is shown. FIG.

4 may depict a more detailed functional embodiment representing the case of a single user device 402 operated by a single user 406, e.g., for simplicity of explanation. In some embodiments, many more users 406 and/or respective user devices 402 may be in communication with a test system 410 than are explicitly depicted in FIG. 4. According to some embodiments, the system 400 (and/or the test system 410) may comprise a microservice 420 in communication with a database 440. In some embodiments, the user 406 may utilize the user device 402 to create, develop, define, generate, compile, and/or execute a program, such as an API 442, that is operable to be tested via the test system 410. According to some embodiments, the microservice 420 may automatically manage the flow of data 444a-c in the system 400 to allow for more efficient and/or reliable testing of the API 442.

The API 442, for example, may require test data 444a to be inserted and/or added to the database 440 (e.g., as the data 444b) for testing to occur (or to be successful). In some embodiments, the API 442 may comprise a test version of a microservice, API, and/or application suite that is programmed to operate upon various data elements, such as credit card numbers, message queue entries, addresses, other transactional data, etc. For the API 442 to be tested, the test data 444a, comprising various data elements 446 of the requisite types of data, may need to be resident in the database 440, e.g., as the data 444b. As described herein, typical testing processes require the user 406 to create the test data 444a and add the data elements 446 thereof into the data 444b of the database 440. Such typical processes also require the user 406 to backout (i.e., remove) the data elements 446 from the data 444b at the end of the testing process. Also, as described herein, not only does the reliance on the user 406 to manage the test data 444a unduly tie up valuable resources, but in the context of a test system 410 that is utilized by multiple parties (not shown in FIG. 4), it is likely to cause data conflicts between various different testing activities.

In some embodiments, the microservice 420 may solve these and/or other deficiencies by automatically managing the test data 444a during the testing process. As indicated by the functional flow numbering in FIG. 4, for example, the user 406 may utilize the user device 402 to develop the API 442 and/or to initiate API testing, at 1. According to some embodiments, the API 442 may automatically generate the test data 444a that may comprise, for example, one or more calls to the microservice 420 (e.g., in the format "microservice_name.command_name.test_data") and/or the data elements 446, at 2. In some embodiments, the API 442 may utilize and/or execute the test data 444a by initiating a first call to the microservice 420 to add the data elements 446 to the database 440 (e.g., in the format "microservice_name.ADD.test_data"), at 3. According to some embodiments, e.g., in response to the first call, the microservice 420 may acquire the data elements 446, store them in memory 444c, and assign unique identifiers 448 to the data elements 446, at 4. In some embodiments, the microservice 420 may then add the data elements 446 and/or identifiers 448 to the data 444b in the database 440, at 5. In some embodiments, such as in the case that the data elements 446 are assigned the identifiers 448 by the database 440 (or otherwise upon entry into the data 444b), the identifiers 448 may be acquired by the microservice 420 (as opposed to being assigned by the microservice 420) and stored in the memory 444c. In some embodiments, although not explicitly depicted in FIG. 4, the microservice 420 may respond to the first call by providing an indication that the adding of the data elements 446 to the database 440 is complete. The response may be sent to the API 442, for example, and in some embodiments may include the identifiers 448.

According to some embodiments, the API 442 may continue executing by communicating with the database 440 and/or acting upon or otherwise utilizing the data elements 446 in the data 444b, at 6. In some embodiments, the API 442 may disengage with the database 440 and/or complete execution with respect to the data 444b, at 7. The API 442 may terminate or conclude execution, for example, by initiating a second call to the microservice 420, as coded into the test data 444a, at 8. The second call may comprise, for example, a call to remove the data elements 446 from the database 440 (e.g., in the format "microservice_name.REMOVE.test_data"). According to some embodiments, e.g., in response to the second call, the microservice 420 may transmit a request or command to remove (delete, inactivate, etc.) the data elements 446 and/or identifiers 448 from the data 444b in the database 440, at 9. In some embodiments, the removal request may comprise a listing or other identification of the identifiers 448 of the data elements 446 desired for removal/deletion. In such a manner, for example, any test data 444a created by the testing of the API 442 may be automatically backed-out of (i.e., removed from) the database 440 without impacting any other testing processes.

In some embodiments, the second call to the microservice 420 may not be necessary. The microservice 420 may comprise a "listener", for example, that monitors the activity/execution state of the API 442 to identify when the API 442 has completed and may accordingly trigger the removal upon a detection of such completion. According to some embodiments, the microservice may itself comprise an API, such as a RESTful state API, that operates under a simple REQUEST/RESPONSE service protocol. In some embodiments, one or more of the data elements 446 may comprise pointers or addresses that the microservice 420 utilizes to acquire the actual data desired for insertion into the database 440. The microservice 420 may call or invoke, for example, a Random Number Generator (RNG), credit card number simulator/generator, message generator, text generator, etc., to formulate or define any or all of the particular data elements 446 of the test data 444a. In some embodiments, the testing results (e.g., output of the API 442) may be provided to the user 406 via the user device 402, at 10.

Fewer or more components 402, 410, 420, 440, 442, 444a-c, 446, 448 and/or various configurations of the depicted components 402, 410, 420, 440, 442, 444a-c, 446, 448 may be included in the system 400 without deviating from the scope of embodiments described herein. In some embodiments, the components 402, 410, 420, 440, 442, 444a-c, 446, 448 may be similar in configuration and/or functionality to similarly named and/or numbered components as described herein. In some embodiments, the system 400 (and/or portions thereof) may comprise an automated test data microservice program, system, and/or platform programmed and/or otherwise configured to execute, conduct, and/or facilitate the method 500 of FIG. 5 herein, and/or portions thereof.

III. Microservice/API Test Methods

Figure 5:
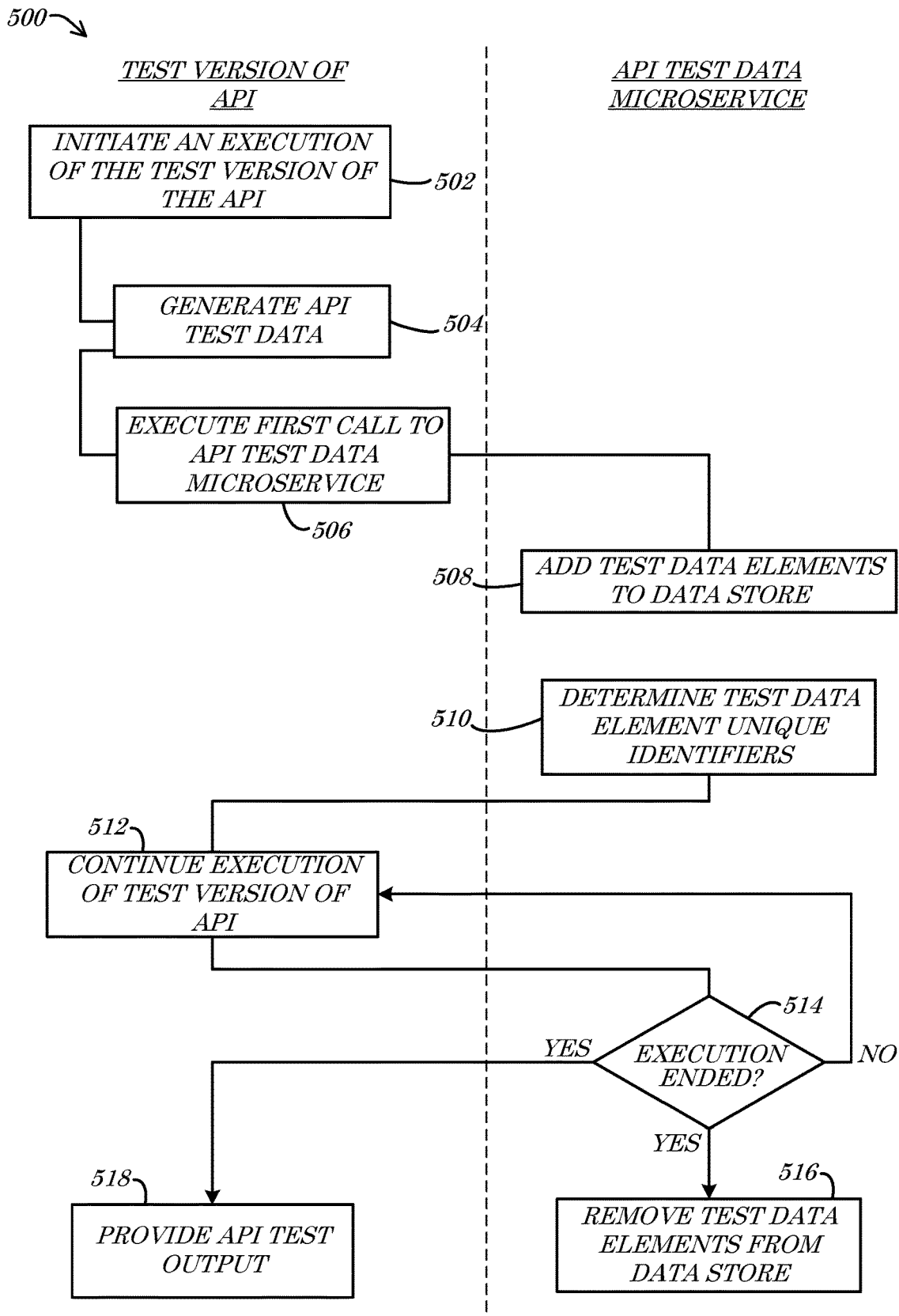
FIG. 5 is a flow diagram of a method according to some embodiments.

Referring now to FIG. 5, a flow diagram of a method 500 according to some embodiments is shown. In some embodiments, the method 500 may be performed and/or implemented by and/or otherwise associated with one or more specialized and/or specially-programmed computers (e.g., one or more of the user devices 102a-n, 302a-c, 402, controller devices/test systems 110, 310, 410, and/or the apparatus 610 of FIG. 1, FIG. 3, FIG. 4, and/or FIG. 6 herein), computer terminals, computer servers, computer systems and/or networks, and/or any combinations thereof (e.g., by one or more multi-threaded and/or multi-core processing units of an automated API test data management system). In some embodiments, the method 500 may be embodied in, facilitated by, and/or otherwise associated with various input mechanisms and/or interfaces (such as the interface 620 of FIG. 6 herein).

The process diagrams and flow diagrams described herein do not necessarily imply a fixed order to any depicted actions, steps, and/or procedures, and embodiments may generally be performed in any order that is practicable unless otherwise and specifically noted. While the order of actions, steps, and/or procedures described herein is generally not fixed, in some embodiments, actions, steps, and/or procedures may be specifically performed in the order listed, depicted, and/or described and/or may be performed in response to any previously listed, depicted, and/or described action, step, and/or procedure. Any of the processes and methods described herein may be performed and/or facilitated by hardware, software (including microcode), firmware, or any combination thereof. For example, a storage medium (e.g., a hard disk, Random Access Memory (RAM) device, cache memory device, Universal Serial Bus (USB) mass storage device, and/or Digital Video Disk (DVD); e.g., the memory/data storage devices 140, 340, 440, 640, 740*a-e* of FIG. 1, FIG. 3, FIG. 4, FIG. 6, FIG. 7A, FIG. 7B, FIG. 7C, FIG. 7D, and/or FIG. 7E herein) may store thereon instructions that when executed by a machine (such as a computerized processor) result in performance according to any one or more of the embodiments described herein.

In some embodiments, the method 500 may comprise initiating (e.g., by an electronic processing device) an execution of a test version of an API, at 502. A programmer, developer, integrator, and/or software tester may, for example, create a test version of a software module, service, extension, and/or application (e.g., an API) and provide input indicative of a request to initiate an execution and/or test of the test version of the API. As described herein, the test version of the API may be coded/configured to automatically create the desired test data and/or may include one or more calls to a microservice. Execution of the test version of the API may be initiated and/or conducted remotely (e.g., on or at a user's workstation) and/or on one or more servers (e.g., a company API development platform and/or test system).

According to some embodiments, the method 500 may comprise generating (e.g., by the electronic processing device executing the test version of the API) test data, at 504. The test version of the API may, for example, initiate execution by generating, selecting, and/or defining one or more data elements that are deemed necessary for the testing of the API. Such test data elements may comprise, for example, one or more simulated transaction records, customer records, messages in a message queue, and/or credit card or other financial account numbers. In some embodiments, the test data elements may comprise copies of actual operational data, e.g., acquired from an operational repository.

In some embodiments, the method 500 may comprise executing (e.g., by the electronic processing device executing the test version of the API) a first call to an API test data microservice, at 506. The test version of the API may, for example, comprise an instruction, command, and/or coded string that initiates or triggers a call to the microservice. The call may be structured in any manner that is or becomes desirable or practicable, such as utilizing any number of desired protocols, object libraries, functions, extensions, services, etc. In some embodiments, the call may comprise an indication of a particular command, such as an add, insert, replace, create, and/or generate command that (upon receipt by the microservice) causes the microservice to undertake one or more predetermined actions.

According to some embodiments, the method 500 may comprise adding (e.g., by the electronic processing device executing the API test data microservice) test data elements to a data store, at 508. The microservice may receive the first call from the test version of the API, for example, and may respond to the call/request by automatically adding the desired test data elements to a target database, file, data store, repository, queue, etc. In some embodiments, one or more test data elements may be generated by (or on behalf of) the microservice. In the case that the test version of the API requests that a series of credit card numbers be added to a particular table of a specific database, for example, the microservice may generate, lookup, and/or requisition the desired credit card numbers. According to some embodiments, the microservice may call a separate service or extension such as an RNG and/or credit card number simulator.

In some embodiments, the method 500 may comprise determining (e.g., by the electronic processing device executing the API test data microservice) test data element unique identifiers, at 510. According to some embodiments, upon addition of the test data elements to the target data store and/or upon generation of the test data elements, a unique identifier may be assigned to each test data element. In some embodiments, the microservice may automatically assign the identifiers to any or all test data provided, identified, and/or requested by the test version of the API (e.g., via the first call). According to some embodiments, one or more of the identifiers may be received from a separate device, program, and/or service. In some embodiments, the identifiers may comprise encoded data indicative of the test version of the API, time/date information, versioning information, an identifier of the user/developer, and/or a project, suite, and/or other contextual identifier.

According to some embodiments, the method 500 may comprise continuing (e.g., by the electronic processing device) execution of the test version of the API, at 512. In some embodiments, the execution of the test version of the API may proceed after having triggered the first call. According to some embodiments, the test version of the API may await a response from the first call to verify that the test data has been successfully generated/stored before continuing. In some embodiments, continued execution of the test version of the API may comprise the test version of the API accessing the target data store (directly or indirectly) by executing program steps that operate upon one or more of the data elements. According to some embodiments, execution of the test version of the API may cause additional data elements to be generated and/or may delete or modify existing data elements, as per the instructions defined by the test version of the API (and/or as defined by the particular testing being conducted).

In some embodiments, the method 500 may comprise determining (e.g., by the electronic processing device) whether execution of the test version of the API has ended, at 514. The test version of the API may be coded to trigger a second call to the microservice upon completion of execution, for example, and/or the microservice may monitor or listen for an event indicative of the completion of execution of the test version of the API. In the case that the test version of the API remains in an execution state and/or execution has otherwise not yet ended, the method 500 may proceed back to continue execution thereof, at 512. In the case that the execution of the test version of the API is determined to have ended (e.g., upon receipt of the second call from the test version of the API, by the microservice) the method 500 may continue by removing (e.g., by the electronic processing device executing the API test data microservice) the test data elements from the data store, at 516. In the case that the microservice listens for execution termination events to run autonomously, the microservice may automatically communicate with the target data store to effectuate a removal of any or all data elements previously added or otherwise associated with the test version of the API. The microservice may, for example, execute a remove or delete command that includes a listing of the corresponding identifiers for the data elements desired for removal.

According to some embodiments, such as in the case that the microservice is notified of completion of the test execution by receiving the second call from the test version of the API, the microservice may remove data elements in accordance with the second call. The second call may, for example, identify and/or specify one or more of the unique data identifiers that correspond to the data elements desired for removal. In the case that the test version of the API has itself added additional data elements during execution, the test version of the API may pass identifiers indicative of such data elements to the microservice for deletion/removal. According to some embodiments, the microservice may transmit a response to the second call/request indicating that the removal was successful (or not, as the case may be).

In some embodiments, the method 500 may comprise providing (e.g., by the electronic processing device executing the test version of the API) output from the test version of the API, at 518. The user/developer may be provided, for example, with data descriptive of the execution of the test version of the API and/or data descriptive of the data management operations conducted by the microservice. According to some embodiments, the microservice may provide a detailed report or listing regarding any or all data elements created, generated, added, removed, and/or modified. The test version of the API may itself provide feedback regarding the execution that the user/developer may utilize to troubleshoot the execution of the test version of the API.

IV. Microservice/API Test Apparatus & Articles of Manufacture

Figure 6:
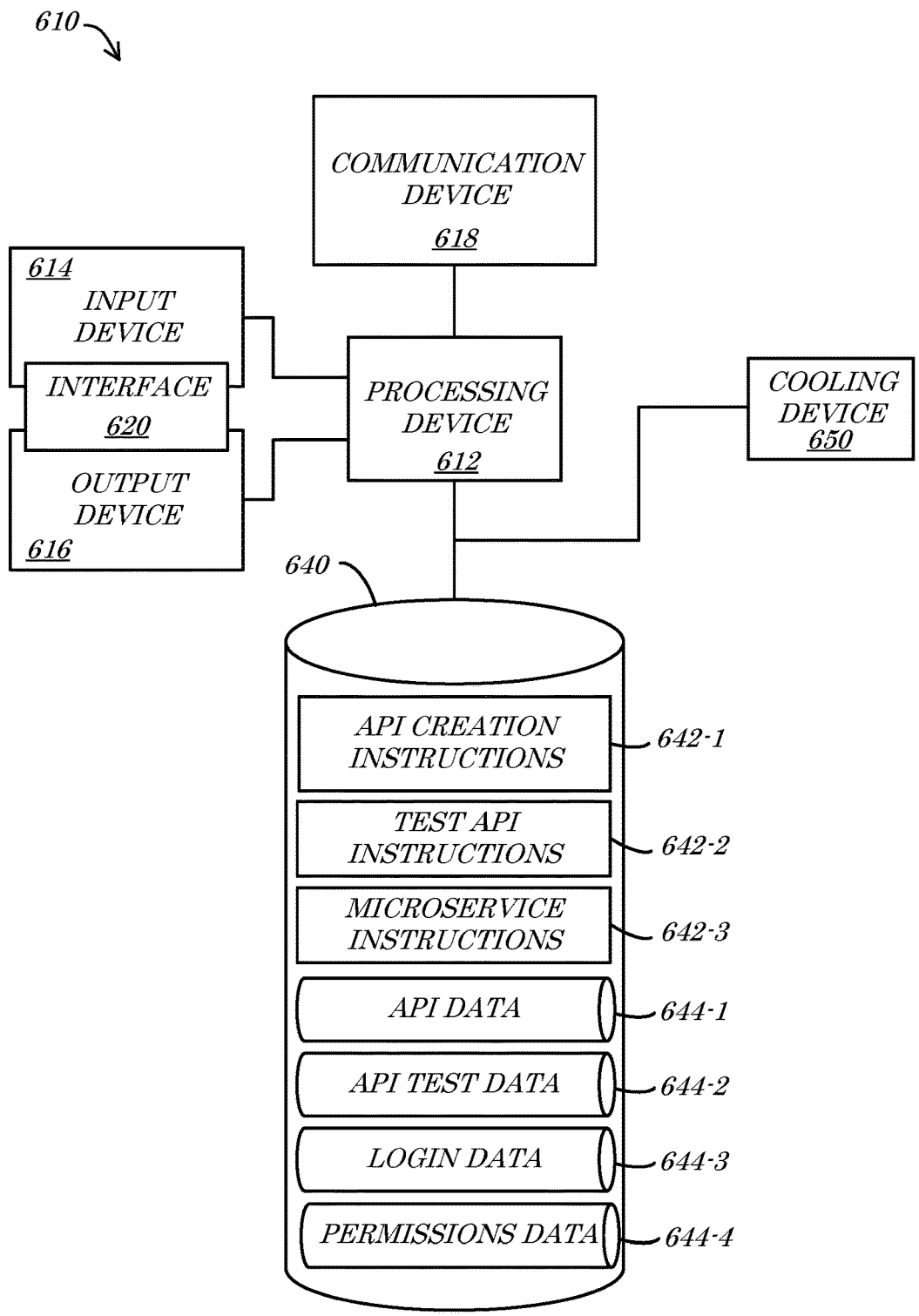
FIG. 6 is a block diagram of an apparatus according to some embodiments.
Figure 7A:
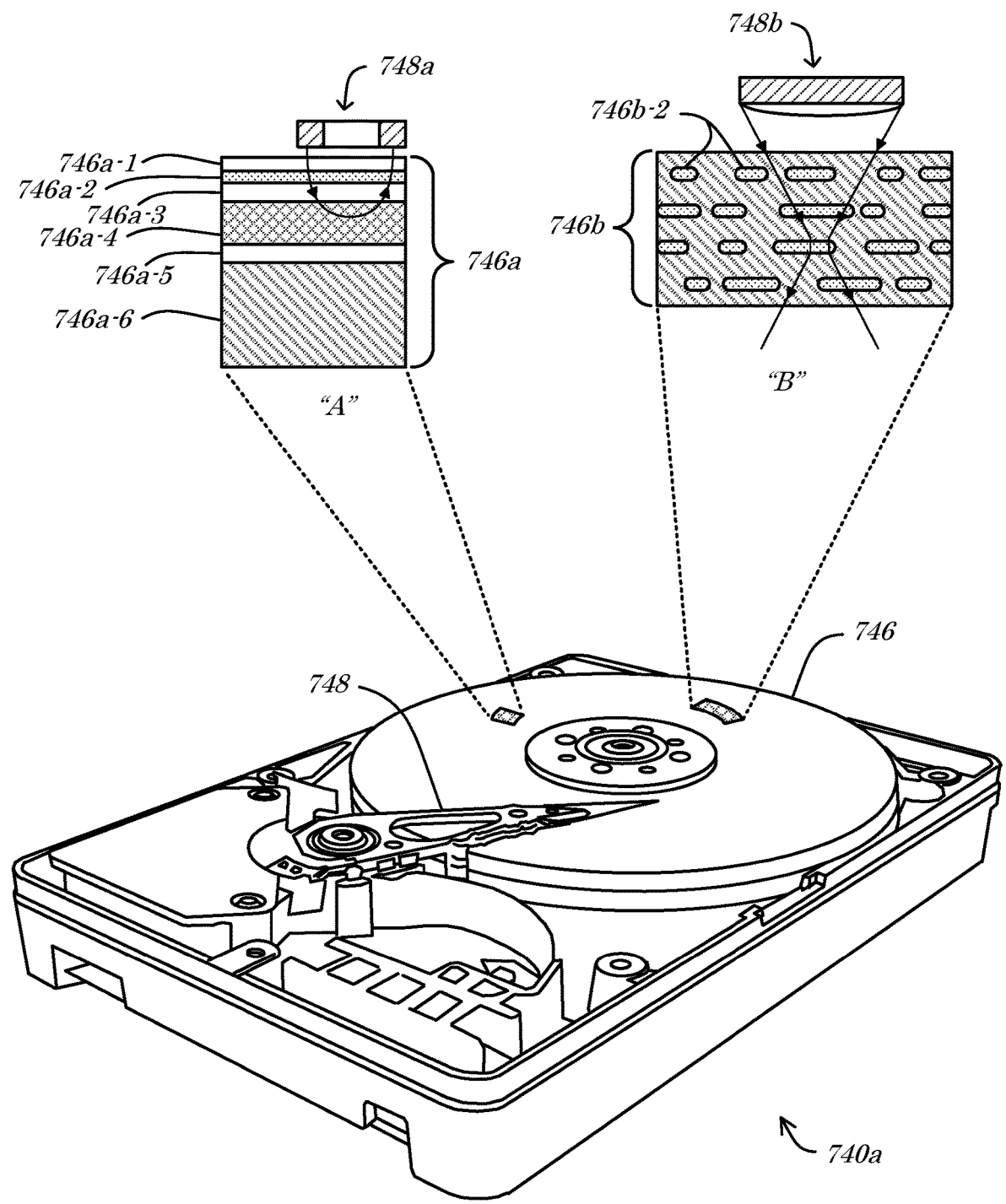
FIG. 7A, FIG. 7B, FIG. 7C, FIG. 7D, and FIG. 7E are perspective diagrams of exemplary data storage devices according to some embodiments.
Figure 7B:
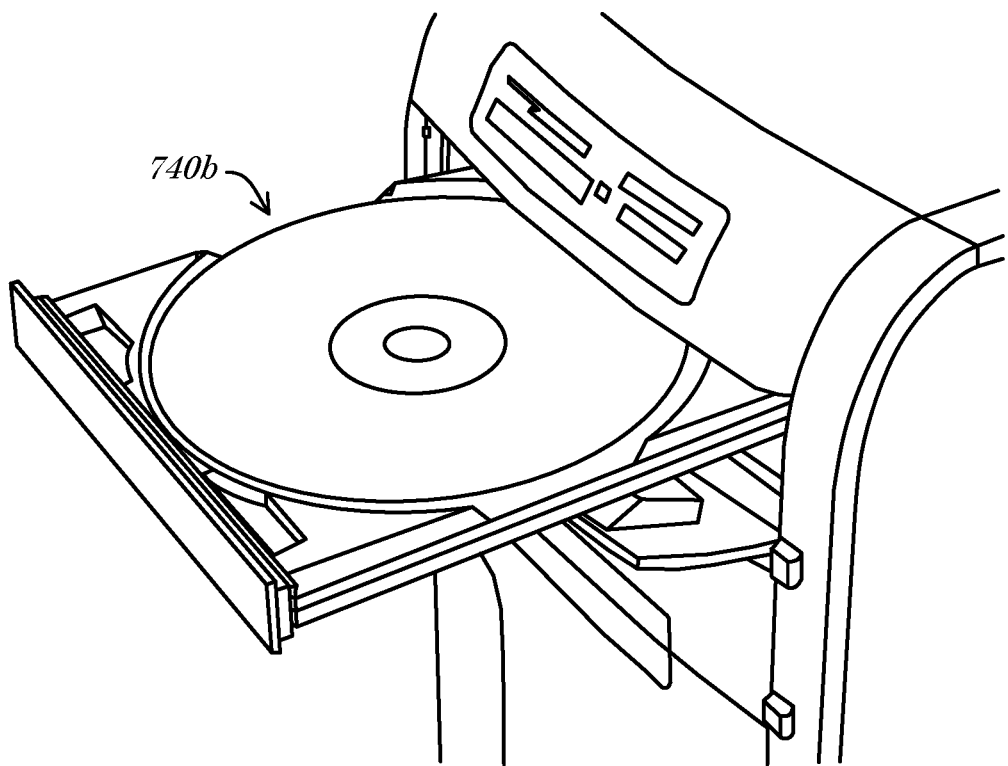
Figure 7C:
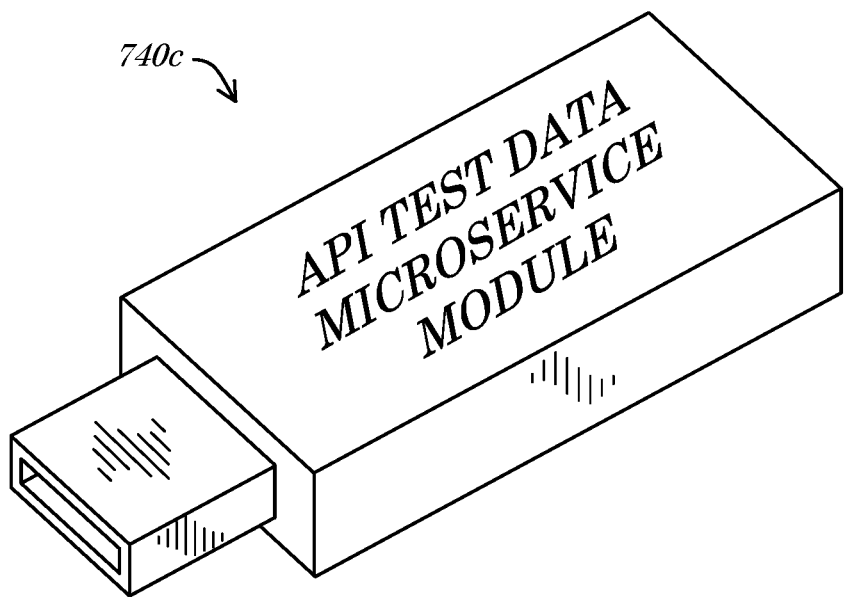
Figure 7D:
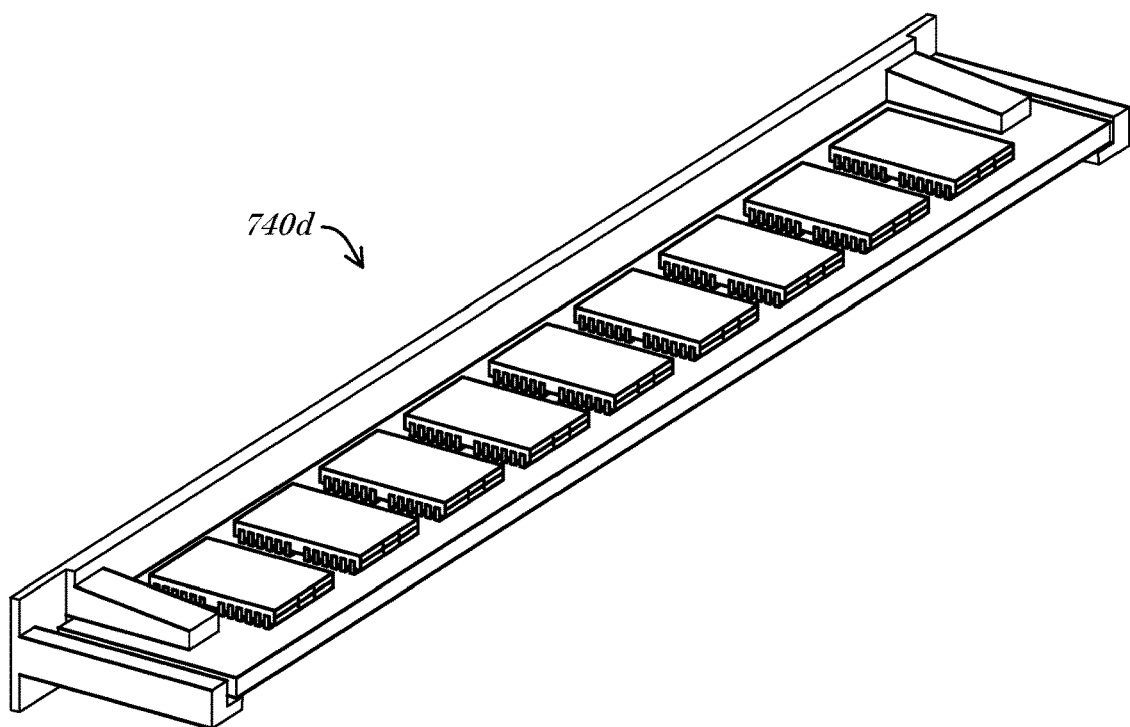
Figure 7E:
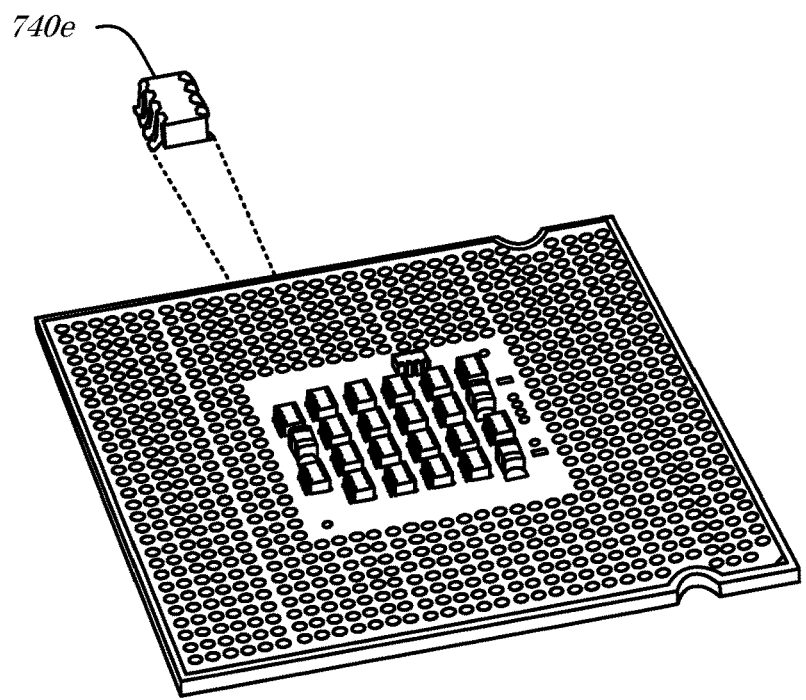

Turning to FIG. 6, a block diagram of an apparatus 610 according to some embodiments is shown. In some embodiments, the apparatus 610 may be similar in configuration and/or functionality to one or more of the user devices 102*a-n*, 302*a-c*, 402 and/or the controller devices/test systems 110, 310, 410 of FIG. 1, FIG. 3, and/or FIG. 4 herein. The apparatus 610 may, for example, execute, process, facilitate, and/or otherwise be associated with the method 500 of FIG. 5 herein, and/or portions thereof. In some embodiments, the apparatus 610 may comprise a processing device 612, an input device 614, an output device 616, a communication device 618, an interface 620, a memory device 640 (storing various programs and/or instructions 642 and data 644), and/or a cooling device 650. According to some embodiments, any or all of the components 612, 614, 616, 618, 620, 640, 642, 644, 650 of the apparatus 610 may be similar in configuration and/or functionality to any similarly named and/or numbered components described herein. Fewer or more components 612, 614, 616, 618, 620, 640, 642, 644, 650 and/or various configurations of the components 612, 614, 616, 618, 620, 640, 642, 644, 650 may be included in the apparatus 610 without deviating from the scope of embodiments described herein.

According to some embodiments, the processor 612 may be or include any type, quantity, and/or configuration of processor that is or becomes known. The processor 612 may comprise, for example, an Intel® IXP 2800 network processor or an Intel® XEON™ Processor coupled with an Intel® E7501 chipset. In some embodiments, the processor 612 may comprise multiple inter-connected processors, microprocessors, and/or micro-engines. According to some embodiments, the processor 612 (and/or the apparatus 610 and/or other components thereof) may be supplied power via a power supply (not shown), such as a battery, an Alternating Current (AC) source, a Direct Current (DC) source, an AC/DC adapter, solar cells, and/or an inertial generator. In the case that the apparatus 610 comprises a server, such as a blade server or a virtual co-location device, necessary power may be supplied via a standard AC outlet, power strip, surge protector, and/or Uninterruptible Power Supply (UPS) device.

In some embodiments, the input device 614 and/or the output device 616 are communicatively coupled to the processor 612 (e.g., via wired and/or wireless connections and/or pathways) and they may generally comprise any types or configurations of input and output components and/or devices that are or become known, respectively. The input device 614 may comprise, for example, a keyboard that allows an operator of the apparatus 610 to interface with the apparatus 610 (e.g., by developer to test and API utilizing an automated API test data microservice, as described herein). The output device 616 may, according to some embodiments, comprise a display screen and/or other practicable output component and/or device. The output device 616 may, for example, provide an interface (such as the interface 620) via which functionality for an automated API test data service is provided to a user (e.g., via a website and/or software development, integration, and/or testing application). According to some embodiments, the input device 614 and/or the output device 616 may comprise and/or be embodied in a single device, such as a touch-screen monitor.

In some embodiments, the communication device 618 may comprise any type or configuration of communication device that is or becomes known or practicable. The communication device 618 may, for example, comprise a Network Interface Card (NIC), a telephonic device, a cellular network device, a router, a hub, a modem, and/or a communications port or cable. In some embodiments, the communication device 618 may be coupled to receive API and/or API test data and/or forward such data to one or more other (e.g., remote) devices (not shown in FIG. 6). According to some embodiments, the communication device 618 may also or alternatively be coupled to the processor 612. In some embodiments, the communication device 618 may comprise an IR, RF, Bluetooth®, Near-Field Communication (NFC), and/or Wi-Fi® network device coupled to facilitate communications between the processor 612 and another device (such as a remote user device, not separately shown in FIG. 6).

The memory device 640 may comprise any appropriate information storage device that is or becomes known or available, including, but not limited to, units and/or combinations of magnetic storage devices (e.g., a hard disk drive), optical storage devices, and/or semiconductor memory devices such as RAM devices, Read Only Memory (ROM) devices, Single Data Rate Random Access Memory (SDR-RAM), Double Data Rate Random Access Memory (DDR-RAM), and/or Programmable Read Only Memory (PROM). The memory device 640 may, according to some embodiments, store one or more of API creation instructions 642-1, test API instructions 642-2, microservice instructions 642-3, API data 644-1, API test data 644-2, login data 644-3, and/or permissions data 644-4. In some embodiments, the API creation instructions 642-1, test API instructions 642-2, microservice instructions 642-3, API data 644-1, API test data 644-2, login data 644-3, and/or permissions data 644-4 may be utilized by the processor 612 to provide output information via the output device 616 and/or the communication device 618.

According to some embodiments, the API creation instructions 642-1 may be operable to cause the processor 612 to process the API data 644-1, API test data 644-2, login data 644-3, and/or permissions data 644-4 in accordance with embodiments as described herein. API data 644-1, API test data 644-2, login data 644-3, and/or permissions data 644-4 received via the input device 614 and/or the communication device 618 may, for example, be analyzed, sorted, filtered, decoded, decompressed, ranked, scored, plotted, and/or otherwise processed by the processor 612 in accordance with the API creation instructions 642-1. In some embodiments, API data 644-1, API test data 644-2, login data 644-3, and/or permissions data 644-4 may be fed by the processor 612 through one or more mathematical, compiling, compression, encoding, AI logic (e.g., neural network), and/or statistical formulas and/or models in accordance with the API creation instructions 642-1 to create, define, select, and/or generate a test version of an API (and/or other software module, service, and/or extension), as described herein.

In some embodiments, the test API instructions 642-2 may be operable to cause the processor 612 to process the API data 644-1, API test data 644-2, login data 644-3, and/or permissions data 644-4 in accordance with embodiments as described herein. API data 644-1, API test data 644-2, login data 644-3, and/or permissions data 644-4 received via the input device 614 and/or the communication device 618 may, for example, be analyzed, sorted, filtered, decoded, decompressed, ranked, scored, plotted, and/or otherwise processed by the processor 612 in accordance with the test API instructions 642-2. In some embodiments, API data 644-1, API test data 644-2, login data 644-3, and/or permissions data 644-4 may be fed by the processor 612 through one or more mathematical, compiling, compression, encoding, AI logic (e.g., neural network), and/or statistical formulas and/or models in accordance with the test API instructions 642-2 to create, define, select, and/or generate API (and/or other software module, service, and/or extension) test data, microservice calls, etc., as described herein.

According to some embodiments, the microservice instructions 642-3 may be operable to cause the processor 612 to process the API data 644-1, API test data 644-2, login data 644-3, and/or permissions data 644-4 in accordance with embodiments as described herein. API data 644-1, API test data 644-2, login data 644-3, and/or permissions data 644-4 received via the input device 614 and/or the communication device 618 may, for example, be analyzed, sorted, filtered, decoded, decompressed, ranked, scored, plotted, and/or otherwise processed by the processor 612 in accordance with the microservice instructions 642-3. In some embodiments, API data 644-1, API test data 644-2, login data 644-3, and/or permissions data 644-4 may be fed by the processor 612 through one or more mathematical, compiling, compression, encoding, AI logic (e.g., neural network), and/or statistical formulas and/or models in accordance with the microservice instructions 642-3 to automatically manage test data (e.g., during a testing routine), as described herein.

According to some embodiments, the apparatus 610 may comprise the cooling device 650. According to some embodiments, the cooling device 650 may be coupled (physically, thermally, and/or electrically) to the processor 612 and/or to the memory device 640. The cooling device 650 may, for example, comprise a fan, heat sink, heat pipe, radiator, cold plate, and/or other cooling component or device or combinations thereof, configured to remove heat from portions or components of the apparatus 610.

Any or all of the exemplary instructions and data types described herein and other practicable types of data may be stored in any number, type, and/or configuration of memory devices that is or becomes known. The memory device 640 may, for example, comprise one or more data tables or files, databases, table spaces, registers, and/or other storage structures. In some embodiments, multiple databases and/or storage structures (and/or multiple memory devices 640) may be utilized to store information associated with the apparatus 610. According to some embodiments, the memory device 640 may be incorporated into and/or otherwise coupled to the apparatus 610 (e.g., as shown) or may simply be accessible to the apparatus 610 (e.g., externally located and/or situated).

Referring to FIG. 7A, FIG. 7B, FIG. 7C, FIG. 7D, and FIG. 7E, perspective diagrams of exemplary data storage devices 740*a-e* according to some embodiments are shown. The data storage devices 740*a-e* may, for example, be utilized to store instructions and/or data such as the API creation instructions 642-1, test API instructions 642-2, microservice instructions 642-3, API data 644-1, API test data 644-2, login data 644-3, and/or permissions data 644-4, each of which is presented in reference to FIG. 6 herein. In some embodiments, instructions stored on the data storage devices 740*a-e* may, when executed by a processor, cause the implementation of and/or facilitate the method 500 of FIG. 5 herein, and/or portions thereof.

According to some embodiments, the first data storage device 740*a* may comprise one or more various types of internal and/or external hard drives. The first data storage device 740*a* may, for example, comprise a data storage medium 746 that is read, interrogated, and/or otherwise communicatively coupled to and/or via a disk reading device 748. In some embodiments, the first data storage device 740*a* and/or the data storage medium 746 may be configured to store information utilizing one or more magnetic, inductive, and/or optical means (e.g., magnetic, inductive, and/or optical-encoding). The data storage medium 746, depicted as a first data storage medium 746*a* for example (e.g., breakout cross-section "A"), may comprise one or more of a polymer layer 746*a*-1, a magnetic data storage layer 746*a*-2, a non-magnetic layer 746*a*-3, a magnetic base layer 746*a*-4, a contact layer 746*a*-5, and/or a substrate layer 746*a*-6. According to some embodiments, a magnetic read head 748*a* may be coupled and/or disposed to read data from the magnetic data storage layer 746*a*-2.

In some embodiments, the data storage medium 746, depicted as a second data storage medium 746*b* for example (e.g., breakout cross-section "B"), may comprise a plurality of data points 746*b*-2 disposed with the second data storage medium 746*b*. The data points 746*b*-2 may, in some embodiments, be read and/or otherwise interfaced with via a laser-enabled read head 748b disposed and/or coupled to direct a laser beam through the second data storage medium 746b.

In some embodiments, the second data storage device 740b may comprise a CD, CD-ROM, DVD, Blu-Ray™ Disc, and/or other type of optically-encoded disk and/or other storage medium that is or becomes know or practicable. In some embodiments, the third data storage device 740c may comprise a USB keyfob, dongle, and/or other type of flash memory data storage device that is or becomes know or practicable. In some embodiments, the fourth data storage device 740d may comprise RAM of any type, quantity, and/or configuration that is or becomes practicable and/or desirable. In some embodiments, the fourth data storage device 740d may comprise an off-chip cache such as a Level 2 (L2) cache memory device. According to some embodiments, the fifth data storage device 740e may comprise an on-chip memory device such as a Level 1 (L1) cache memory device.

The data storage devices 740a-e may generally store program instructions, code, and/or modules that, when executed by a processing device cause a particular machine to function in accordance with one or more embodiments described herein. The data storage devices 740a-e depicted in FIG. 7A, FIG. 7B, FIG. 7C, FIG. 7D, and FIG. 7E are representative of a class and/or subset of computer-readable media that are defined herein as "computer-readable memory" (e.g., non-transitory memory devices as opposed to transmission devices or media).

V. Rules of Interpretation

Throughout the description herein and unless otherwise specified, the following terms may include and/or encompass the example meanings provided. These terms and illustrative example meanings are provided to clarify the language selected to describe embodiments both in the specification and in the appended claims, and accordingly, are not intended to be generally limiting. While not generally limiting and while not limiting for all described embodiments, in some embodiments, the terms are specifically limited to the example definitions and/or examples provided. Other terms are defined throughout the present description.

Some embodiments described herein are associated with a "user device" or a "network device". As used herein, the terms "user device" and "network device" may be used interchangeably and may generally refer to any device that can communicate via a network. Examples of user or network devices include a PC, a workstation, a server, a printer, a scanner, a facsimile machine, a copier, a Personal Digital Assistant (PDA), a storage device (e.g., a disk drive), a hub, a router, a switch, and a modem, a video game console, or a wireless phone. User and network devices may comprise one or more communication or network components. As used herein, a "user" may generally refer to any individual and/or entity that operates a user device. Users may comprise, for example, customers, consumers, product underwriters, product distributors, customer service representatives, agents, brokers, etc.

As used herein, the term "network component" may refer to a user or network device, or a component, piece, portion, or combination of user or network devices. Examples of network components may include a Static Random Access Memory (SRAM) device or module, a network processor, and a network communication path, connection, port, or cable.

In addition, some embodiments are associated with a "network" or a "communication network". As used herein, the terms "network" and "communication network" may be used interchangeably and may refer to any object, entity, component, device, and/or any combination thereof that permits, facilitates, and/or otherwise contributes to or is associated with the transmission of messages, packets, signals, and/or other forms of information between and/or within one or more network devices. Networks may be or include a plurality of interconnected network devices. In some embodiments, networks may be hard-wired, wireless, virtual, neural, and/or any other configuration of type that is or becomes known. Communication networks may include, for example, one or more networks configured to operate in accordance with the Fast Ethernet LAN transmission standard 802.3-2002® published by the Institute of Electrical and Electronics Engineers (IEEE). In some embodiments, a network may include one or more wired and/or wireless networks operated in accordance with any communication standard or protocol that is or becomes known or practicable.

As used herein, the terms "information" and "data" may be used interchangeably and may refer to any data, text, voice, video, image, message, bit, packet, pulse, tone, waveform, and/or other type or configuration of signal and/or information. Information may comprise information packets transmitted, for example, in accordance with the Internet Protocol Version 6 (IPv6) standard as defined by "Internet Protocol Version 6 (IPv6) Specification" RFC 1883, published by the Internet Engineering Task Force (IETF), Network Working Group, S. Deering et al. (December 1995). Information may, according to some embodiments, be compressed, encoded, encrypted, and/or otherwise packaged or manipulated in accordance with any method that is or becomes known or practicable.

In addition, some embodiments described herein are associated with an "indication". As used herein, the term "indication" may be used to refer to any indicia and/or other information indicative of or associated with a subject, item, entity, and/or other object and/or idea. As used herein, the phrases "information indicative of" and "indicia" may be used to refer to any information that represents, describes, and/or is otherwise associated with a related entity, subject, or object. Indicia of information may include, for example, a code, a reference, a link, a signal, an identifier, and/or any combination thereof and/or any other informative representation associated with the information. In some embodiments, indicia of information (or indicative of the information) may be or include the information itself and/or any portion or component of the information. In some embodiments, an indication may include a request, a solicitation, a broadcast, and/or any other form of information gathering and/or dissemination.

Numerous embodiments are described in this patent application, and are presented for illustrative purposes only. The described embodiments are not, and are not intended to be, limiting in any sense. The presently disclosed invention(s) are widely applicable to numerous embodiments, as is readily apparent from the disclosure. One of ordinary skill in the art will recognize that the disclosed invention(s) may be practiced with various modifications and alterations, such as structural, logical, software, and electrical modifications. Although particular features of the disclosed invention(s) may be described with reference to one or more particular embodiments and/or drawings, it should be understood that such features are not limited to usage in the one or more particular embodiments or drawings with reference to which they are described, unless expressly specified otherwise.

Devices that are in communication with each other need not be in continuous communication with each other, unless expressly specified otherwise. On the contrary, such devices need only transmit to each other as necessary or desirable, and may actually refrain from exchanging data most of the time. For example, a machine in communication with another machine via the Internet may not transmit data to the other machine for weeks at a time. In addition, devices that are in communication with each other may communicate directly or indirectly through one or more intermediaries.

A description of an embodiment with several components or features does not imply that all or even any of such components and/or features are required. On the contrary, a variety of optional components are described to illustrate the wide variety of possible embodiments of the present invention(s). Unless otherwise specified explicitly, no component and/or feature is essential or required.

Further, although process steps, algorithms or the like may be described in a sequential order, such processes may be configured to work in different orders. In other words, any sequence or order of steps that may be explicitly described does not necessarily indicate a requirement that the steps be performed in that order. The steps of processes described herein may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to the invention, and does not imply that the illustrated process is preferred.

"Determining" something can be performed in a variety of manners and therefore the term "determining" (and like terms) includes calculating, computing, deriving, looking up (e.g., in a table, database or data structure), ascertaining and the like.

It will be readily apparent that the various methods and algorithms described herein may be implemented by, e.g., appropriately and/or specially-programmed computers and/or computing devices. Typically a processor (e.g., one or more microprocessors) will receive instructions from a memory or like device, and execute those instructions, thereby performing one or more processes defined by those instructions. Further, programs that implement such methods and algorithms may be stored and transmitted using a variety of media (e.g., computer readable media) in a number of manners. In some embodiments, hard-wired circuitry or custom hardware may be used in place of, or in combination with, software instructions for implementation of the processes of various embodiments. Thus, embodiments are not limited to any specific combination of hardware and software A "processor" generally means any one or more microprocessors, CPU devices, computing devices, microcontrollers, digital signal processors, or like devices, as further described herein.

The term "computer-readable medium" refers to any medium that participates in providing data (e.g., instructions or other information) that may be read by a computer, a processor or a like device. Such a medium may take many forms, including but not limited to, non-volatile media, volatile media, and transmission media. Non-volatile media include, for example, optical or magnetic disks and other persistent memory. Volatile media include DRAM, which typically constitutes the main memory. Transmission media include coaxial cables, copper wire and fiber optics, including the wires that comprise a system bus coupled to the processor. Transmission media may include or convey acoustic waves, light waves and electromagnetic emissions, such as those generated during RF and IR data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, a carrier wave, or any other medium from which a computer can read.

The term "computer-readable memory" may generally refer to a subset and/or class of computer-readable medium that does not include transmission media such as waveforms, carrier waves, electromagnetic emissions, etc. Computer-readable memory may typically include physical media upon which data (e.g., instructions or other information) are stored, such as optical or magnetic disks and other persistent memory, DRAM, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, computer hard drives, backup tapes, Universal Serial Bus (USB) memory devices, and the like.

Various forms of computer readable media may be involved in carrying data, including sequences of instructions, to a processor. For example, sequences of instruction (i) may be delivered from RAM to a processor, (ii) may be carried over a wireless transmission medium, and/or (iii) may be formatted according to numerous formats, standards or protocols, such as Bluetooth™, TDMA, CDMA, 3G.

Where databases are described, it will be understood by one of ordinary skill in the art that (i) alternative database structures to those described may be readily employed, and (ii) other memory structures besides databases may be readily employed. Any illustrations or descriptions of any sample databases presented herein are illustrative arrangements for stored representations of information. Any number of other arrangements may be employed besides those suggested by, e.g., tables illustrated in drawings or elsewhere. Similarly, any illustrated entries of the databases represent exemplary information only; one of ordinary skill in the art will understand that the number and content of the entries can be different from those described herein. Further, despite any depiction of the databases as tables, other formats (including relational databases, object-based models and/or distributed databases) could be used to store and manipulate the data types described herein. Likewise, object methods or behaviors of a database can be used to implement various processes, such as the described herein. In addition, the databases may, in a known manner, be stored locally or remotely from a device that accesses data in such a database.

The present invention can be configured to work in a network environment including a computer that is in communication, via a communications network, with one or more devices. The computer may communicate with the devices directly or indirectly, via a wired or wireless medium such as the Internet, LAN, WAN or Ethernet, Token Ring, or via any appropriate communications means or combination of communications means. Each of the devices may comprise computers, such as those based on the Intel® Pentium® or Centrino™ processor, that are adapted to communicate with the computer. Any number and type of machines may be in communication with the computer.

The present disclosure provides, to one of ordinary skill in the art, an enabling description of several embodiments and/or inventions. Some of these embodiments and/or inventions may not be claimed in the present application, but may nevertheless be claimed in one or more continuing applications that claim the benefit of priority of the present application. Applicants intend to file additional applications to pursue patents for subject matter that has been disclosed and enabled but not claimed in the present application.

It will be understood that various modifications can be made to the embodiments of the present disclosure herein without departing from the scope thereof. Therefore, the above description should not be construed as limiting the disclosure, but merely as embodiments thereof. Those skilled in the art will envision other modifications within the scope of the invention as defined by the claims appended hereto.

What is claimed is:

1. A method for shared API test data microservices operating in a shared testing environment, the method performed by an electronic processing device, comprising:
   generating, by a test version of a first API, first API test data, wherein the first API test data comprises a first call to an API test data microservice;
   initiating an execution of the test version of the first API utilizing the first API test data, wherein the initiating comprises executing the first call to the API test data microservice;
   adding, automatically by the API test data microservice and in response to the executed first call to the API test data microservice, a first plurality of test data elements from the first API test data to a shared test environment data store;
   storing, by the API test data microservice and for each test data element of the first plurality of test data elements from the first API test data that are added to the shared test environment data store, a unique test data element identifier;
   continuing an execution of the test version of the first API utilizing the first plurality of test data elements from the first API test data that are added to the shared test environment data store;
   concluding the execution of the test version of the first API; and
   removing, automatically by the API test data microservice, in response to the concluding, and utilizing the unique test data element identifiers for the first plurality of test data elements from the first API test data that are added to the shared test environment data store, the first plurality of test data elements from the first API test data from the shared test environment data store.

2. The method of claim 1, further comprising:
   receiving, from a programmer device in communication with the electronic processing device, data defining the test version of the first API.

3. The method of claim 1, further comprising:
   passing, by the API test data microservice and to the test version of the first API, and in response to an indication of the executed first call to the API test data microservice, unique test data element identifiers for the first plurality of test data elements from the first API test data that are added to the shared test environment data store.

4. The method of claim 1, wherein the first call to the API test data microservice comprises an identification of the shared test environment data store from a listing of a plurality of available shared test environment data stores.

5. The method of claim 1, wherein the first call to the API test data microservice comprises an identification of an address of the shared test environment data store.

6. The method of claim 5, wherein the first call to the API test data microservice comprises an identification of an address of a specific location within the shared test environment data store.

7. The method of claim 1, wherein the shared test environment data store comprises a database.

8. The method of claim 1, wherein the shared test environment data store comprises a message queue.

9. The method of claim 1, wherein the API test data microservice comprises a RESTful API.

10. The method of claim 1, wherein the first API test data comprises a second call to the API test data microservice and wherein the concluding of the execution of the test version of the first API comprises executing the second call to the API test data microservice.

11. The method of claim 10, wherein the second call to the API test data microservice defines a request to conduct the removing.

12. The method claim 11, wherein the request to conduct the removing comprises an indication of the unique test data element identifiers for the first plurality of test data elements from the first API test data that are added to the shared test environment data store.

13. The method of claim 1, wherein the first API test data comprises a message in a message queue.

14. The method of claim 1, wherein the first API test data comprises simulated credit card transaction data.

15. The method of claim 1, wherein the first API test data comprises a flat file.

16. The method of claim 1, further comprising:
   generating, by a test version of a second API, second API test data, wherein the second API test data comprises a second call to the API test data microservice;
   initiating an execution of the test version of the second API utilizing the second API test data, wherein the initiating comprises executing the second call to the API test data microservice;
   adding, automatically by the API test data microservice and in response to the executed second call to the API test data microservice, a second plurality of test data elements from the second API test data to the shared test environment data store;
   storing, by the API test data microservice and for each test data element of the second plurality of test data elements from the second API test data that are added to the shared test environment data store, a unique test data element identifier;
   continuing an execution of the test version of the second API utilizing the second plurality of test data elements from the second API test data that are added to the shared test environment data store;
   concluding the execution of the test version of the second API; and
   removing, automatically by the API test data microservice, in response to the concluding of the execution of the test version of the second API, and utilizing the unique test data element identifiers for the second plurality of test data elements from the second API test data that are added to the shared test environment data store, the second plurality of test data elements from the second API test data from the shared test environment data store.

\* \* \* \* \*